(12) United States Patent
Anguil

(10) Patent No.: US 6,832,480 B1
(45) Date of Patent: Dec. 21, 2004

(54) POWER GENERATION SYSTEM UTILIZING OXIDIZED GASES FROM WASTE COMBUSTION

(76) Inventor: Gene Anguil, 869 East Birch Ave., Milwaukee, WI (US) 53217-5360

( * ) Notice: Subject to any disclaimer, the term of this patent is extended or adjusted under 35 U.S.C. 154(b) by 0 days.

(21) Appl. No.: 10/305,729

(22) Filed: Nov. 27, 2002

(51) Int. Cl.⁷ .............................................. F01K 13/02
(52) U.S. Cl. .......................................... 60/646; 60/657
(58) Field of Search ........................... 60/646, 657, 670

(56) References Cited

U.S. PATENT DOCUMENTS

| | | | | |
|---|---|---|---|---|
| 3,881,004 A | * | 4/1975 | Kelly et al. .................. | 423/235 |
| 3,969,899 A | * | 7/1976 | Nakazawa et al. ............ | 60/670 |
| 4,169,583 A | * | 10/1979 | Cramer ........................ | 266/122 |
| 4,202,168 A | * | 5/1980 | Acheson et al. .............. | 60/777 |
| 4,852,344 A | | 8/1989 | Warner | |
| 5,384,051 A | * | 1/1995 | McGinness ................. | 210/761 |
| 5,558,783 A | * | 9/1996 | McGuinness ............... | 210/761 |
| 5,623,822 A | | 4/1997 | Schuetzenduebel et al. | |
| 5,724,807 A | | 3/1998 | Schuetzenduebel et al. | |
| 5,988,080 A | | 11/1999 | Miyoshi et al. | |
| 6,116,169 A | | 9/2000 | Miyoshi et al. | |
| 6,205,704 B1 | * | 3/2001 | Schmitz et al. ................ | 47/17 |
| 6,261,093 B1 | | 7/2001 | Matros et al. | |
| 6,318,088 B1 | | 11/2001 | Miyoshi et al. | |
| 6,321,540 B1 | | 11/2001 | Miyoshi et al. | |

* cited by examiner

Primary Examiner—Hoang Nguyen
(74) Attorney, Agent, or Firm—Boyle Fredrickson Newholm Stein & Gratz, S.C.

(57) ABSTRACT

An improved system and method for using a portion of an oxidized process gas stream resulting from the destruction or abatement of industrially generated pollutants such as Volatile Organic Compounds (VOCs) and Hazardous Air Pollutants (HAPs) in a thermal oxidizer. This system and method produces steam and/or electric power using the heat of a portion of the oxidized gas stream without requiring any increase in the amount of auxiliary fuel that is normally used in the oxidizer. Further, although carbon dioxide ($CO_2$) is generated in the oxidation of the pollutants using the oxidizer, the generation of steam and/or electric power from the oxidized gas stream is accomplished without the generation of any additional $CO_2$.

23 Claims, 3 Drawing Sheets

POWER GENERATION SYSTEM UTILIZING OXIDIZED GASES FROM WASTE COMBUSTION

FIELD OF THE INVENTION

The present invention relates to a method for power generation, and more specifically to a power generation method that utilizes a portion of a stream of oxidized gas produced by a pollution abatement process to generate power without generating any additional carbon dioxide.

BACKGROUND OF THE INVENTION

The Clean Air Act of 1970 and 1990 imposed upon the country the need to control the emission of Volatile Organic Compounds (VOCs) and Hazardous Air Pollutants (HAPs) to the atmosphere. VOCs and HAPs are found in significant amounts in waste gas streams created as a result of the implementation of industrial processes. Since VOCs are a precursor of smog, and HAPs are typically detrimental to health, the amount of VOCs and HAPs that are released into the atmosphere need to be substantially reduced or eliminated entirely.

The industries and processes that need to control their output of VOCs and HAPs include the printing, chemical, pharmaceutical manufacturing, automotive coating and painting, bakeries, can coating, wood manufacturing, medical device sterilization, soil remediation, and metal decorating industries, among others. The gas flow volumes output by these various types of operations can vary from between 100 CFM and 100,000 CFM. The VOCs and HAPs in the output gas streams are measured in terms of the LEL (lower explosive limit), where 100% of the LEL, which is different for each organic compound, means that a spark in the presence of a vapor of the organic compound at 100% LEL will yield an explosion. Since all companies need to avoid explosions, the National Fire Protection Association, NFPA, has required that the amount of the various compounds in the waste gas stream should be below 25% of the LEL, which in turn gives a 4:1 safety factor, if no LEL measurement is made, and below 50% of the LEL if continuous measurements are made.

The waste or process gas streams actually being produced that need to have their pollutant levels controlled have much lower organic compound levels and percent LEL, and represent significantly higher air volumes than those treated in the past. Specifically, most waste gas streams produced today contain from about 5% of the LEL to about 1% LEL. However, due to increasingly stringent restrictions on the amounts of VOCs and HAPs that can be discharged to the atmosphere, even these smaller overall amounts of organic compounds must be removed from waste gas streams. Thus, the waste process gas streams must be passed through facilities that can eliminate the VOCs and HAPs from the streams.

In most cases, the VOCs and/or HAPs are removed from the gas stream by oxidizing the VOCs or HAPs in the stream. Simply put, oxidization is the reaction of an organic compound with an oxidizing agent, such as a catalyst or oxygen. There are two fundamental methods for oxidizing a hydrocarbon such as a VOC or a HAP. One method of performing oxidation of hydrocarbons such as VOCs and HAPs in a gas stream is the thermal oxidization method. Thermal oxidation is a method where a hydrocarbon molecule (hydrogen+carbon) such as a VOC or HAP is raised to a temperature where the hydrocarbon in the waste gas stream reacts with oxygen that is present or added to the waste gas stream to form carbon dioxide ($CO_2$) and water vapor ($H_2O$) plus heat, where the energy given off by the oxidation reaction is due to the combustion of the VOCs and/or HAPs which are being oxidized. More particularly, in an oxidation reaction the hydrocarbon (VOC or HAP) is raised to oxidation temperatures of between 1400–1800 degrees F. at which the oxidation reaction can occur rapidly, and held at this temperature for a specified "residence time" of from 0.5 seconds to 2.0 seconds to ensure completion of the reaction. In addition to temperature and time, a third variable that determines the efficacy of the oxidation method is turbulence to ensure sufficient contact of the oxidation reactants with one another, which is achieved by the design of the equipment through which the waste gas stream flows during the thermal oxidization process.

A second method of oxidizing a hydrocarbon is the catalytic oxidation method. In this method, a catalyst, similar to the catalyst in an automobile catalytic converter, reacts with the hydrocarbons (VOCs and HAPS) in the gas stream passing through the catalyst to convert the hydrocarbons to the same reaction products as for thermal oxidation, namely, carbon dioxide ($CO_2$) and water vapor ($H_2O$) plus heat. The catalyst allows the oxidation process to take place at significantly lower temperatures, i.e., from 450–800 degrees F. Also, in the catalytic oxidation method the residence time of the process gas stream in the equipment is reduced to 0.1–0.3 seconds. However, due to the cost of the catalyst used in this method and the inability to regenerate the catalyst, the catalytic oxidation method is frequently cost prohibitive for use in conjunction with large industrial process gas streams. Thus, thermal oxidation is the preferred method for eliminating VOCs and HAPs from gas streams.

When the thermal oxidation method is to be employed, there are three types of thermal oxidizers that can be used. The three types of thermal oxidizers are: (1) a direct fired oxidizer; (2) a recuperative thermal oxidizer; and (3) a regenerative thermal oxidizer.

The direct fixed oxidizer operates on the principal that the combustion process gas stream is brought into a furnace section of the direct oxidizer, in which the temperature of the gas stream is raised to 1400 degrees F. The process gas stream is held in the furnace section at this temperature for the required residence time in order to fully oxidize the VOCs and HAPs in the stream, as discussed above. However, a significant problem with direct fired oxidizers when they are used to oxidize hydrocarbons in a process gas stream is that the incoming process gas stream is frequently not constant in terms of flow rate or in terms of the available BTUs from the varying amounts of hydrocarbon components in the process gas stream that are to be oxidized. Therefore, because the heat output of the combustion of the hydrocarbon in the process gas stream is alone not sufficient to raise the temperature of the incoming process gas flow to above the necessary oxidation temperature, the energy supplied by the hydrocarbons to raise the temperature of the process gas stream will often have to be supplemented with heat supplied by burning a large amount of natural gas or oil. As a result, the use of a direct fixed oxidizer is not cost effective because of the high-energy input to raise and maintain the temperatures of the VOC laden gases from ambient temperatures to above at least 1400 degrees F.

The second type of thermal oxidizer is the recuperative thermal oxidizer. This type of oxidizer operates on the principal that in order to reduce the energy input necessary for destroying the VOCs and HAPs in the process gas stream. To do so, a metallic recuperator is positioned directly upstream of the oxidizing chamber and is used to preheat the incoming process gas stream using the previously oxidized gas stream which has been raised to above 1400 degrees F, thereby reducing the amount of supplemental fuel required to bring the incoming process gas stream up to the oxidizing temperature. The metallic recuperators used in a recuperative thermal oxidizer can achieve an efficiency of 70–80% when used in an oxidation process.

The third and final type of thermal oxidizer is the regenerative thermal oxidizer. This type of oxidizer is specifically designed for use in oxidizing large process gas flows having low organic compound concentrations, i.e., low percentages of VOCs and HAPs in the process gas stream. This type of oxidizer includes an oxidizing chamber that is connected to a number of ceramic heat exchangers which are used to preheat the incoming process gas stream, thereby reducing the amount of auxiliary fuel required to bring the waste gas stream up to the oxidizing temperature, similar to the recuperative thermal oxidizer. The ceramic heat exchangers are heated to preheat the incoming process gas stream by cycling the oxidized process gas stream in opposite directions through each of the heat exchangers by the operation of a valve system connected to the oxidizer. The ceramic heat exchangers used in a regenerative thermal oxidizer can achieve an efficiency of 95%.

The fuel cost of raising these large process gas streams from a low incoming temperature, which is frequently ambient, to the thermal destruction temperature of 1,400 degrees F. is quite large. Even when highly efficient heat exchangers are used to preheat the incoming gas, these fuel costs are only reduced to a certain extent, and in many cases cannot be eliminated entirely. Therefore, other avenues to reduce the overall cost of oxidizing the pollutants in these gas streams have been explored.

One possible solution is the use of distributed power generation (DPG) at the site of the oxidation process. DPG is the integrated or stand-alone use of small modular electric generation close to the point of consumption for the benefit or use of the consuming site. DPG is increasing in importance as a result of four independent trends—utility industry restructuring, increasing system capacity needs, decisions to not build conventional power plants or transmission systems, and technology advancement.

In the particular situation of oxidizing pollutants in process gas streams, which must be accomplished in order to meet the present emission standards, the pollutant-free process gas stream exiting the oxidizer can be used for the cogeneration of steam and power without creating additional $CO_2$ that would be created if the power was obtained from a conventional utility, such as a coal based power plant. The generation of power without any consequent generation of $CO_2$ is also highly desirable based on the significant restrictions that have recently been placed on industries in many countries.

Unfortunately, prior art attempts to generate power utilizing the energy in a process gas stream exiting an oxidizer have been unable to effectively generate power without also creating additional $CO_2$. More specifically, once the large volume of incoming process gas passes through the recuperator or heat exchanger in the process gas stream path to the oxidizer, the temperature of the incoming gas stream has been raised close to or above the auto-ignition temperature for the organic compounds in the process gas stream, and hence the VOCs and or HAPs are ignited and destroyed, releasing energy. Since the primary objective of the oxidizer (of whatever type) is to destroy the organic pollutants in the process gas stream, it is necessary to maintain the gas at or above the combustion temperature for the appropriate residence time to ensure the destruction of all VOCs and HAPs, as stated previously. Therefore, any attempt to divert the process gas stream from the oxidizer for other purposes, such as steam generation and/or power generation, will result in a reduced residence time for the process gas stream in the oxidizer and hence the inability to completely remove the pollutants and meet the EPA mandated destruction efficiencies. Even if the process gas stream were diverted after having all of the pollutants oxidized, in a recuperative or regenerative oxidizer the oxidized process gas stream would not be available to pass through the heat exchanger of the oxidizer and preheat the incoming process gas stream, thus increasing fuel usage to heat the incoming gas thereby increasing the cost of oxidizing the gas stream. As a result, these two types of oxidizers have been tied into boilers to generate the steam using the oxidized process gas stream, but only after the oxidized gas stream has passed through the recuperator or heat exchanger and lost the majority of the heat energy of the stream. Further, direct fired oxidizers, while able to divert the entire oxidized process gas stream to a boiler for steam generation, have such high energy costs, as discussed previously, as to make them unsuitable for use in distributed power generation.

Therefore, due to the high energy content of the oxidized or treated process gas stream flowing from an oxidizer, it is desirable to develop an apparatus and method for using the treated gas stream for generating power onsite. It is desirable to develop such a system with known components that does not create any $CO_2$ in addition to that generated by the oxidizer and that does not detrimentally affect the operation of the recuperators or heat exchangers used in the oxidizer.

SUMMARY OF THE INVENTION

It is an object of the present invention to provide a system and method for the generation of on-site electric power by the diversion of a portion of the oxidized or treated process gas stream from an oxidizer that is used to remove hazardous components from the incoming process gas stream without detrimentally affecting the operation of the oxidizer.

It is a further object of the present invention to provide a system and method in which the diversion of the portion of the treated gas stream also generates steam which can be utilized in addition to the electric power.

It is another object of the present invention to provide a system and method in which the generation of the electric power is performed without the creation of any carbon dioxide ($CO_2$) in addition to that generated by the oxidizer.

It is still another object of the present invention to provide a system and method in which the components of the system and their operation in the method are well known and easily utilized to form the system and perform the method.

The present invention is a system and method for use with equipment for oxidizing an incoming process gas stream to remove hazardous air pollutants (HAPs) and volatile organic compounds (VOCs) from the process gas stream. After the process gas stream has been oxidized or treated, the system diverts only a portion of the oxidized process gas stream through a heat exchanger and utilizes the elevated temperature of the diverted process gas stream to generate a pressurized flow of steam. The remainder of the oxidized process gas stream that is not diverted passes through a heat exchanger on the oxidizer that is used to preheat the incoming process gas stream to the oxidizer. The diverted process gas stream and the remainder of the oxidized process gas stream are then vented to the atmosphere after generating the steam, and preheating the incoming process gas stream, respectively. The steam created by the diverted process gas stream is directed to a microsteam turbine which uses the flow of pressurized steam through the turbine to rotate turbine blades fixed to a rotatable output shaft extending outwardly from the turbine. The output shaft is connected to an electric generator such that the rotation of the output shaft operates the generator to generate electric power. This electric power is then transferred to an electric switchgear to distribute the generated electric power back to the plant for use as necessary.

Further, after the now-depressurized flow of steam has exited the turbine, some or all of the flow of steam can be diverted through a plant steam header to a process boiler for further use within the plant. The remainder of the flow of depressurized steam, if any, is passed through a condenser and combined with make-up water in a feed-water heater prior to re-entering the heat exchanger for reuse in forming the pressurized flow of steam by the diverted portion of the process gas stream.

All of the power generated by the system and method of the present invention, whether by the turbine or by the steam directed to the process boiler, is created without the burning of additional fuel and the generation of additional carbon dioxide ($CO_2$), thus making the system and method very efficient with regard to the energy output from the system.

Various other features, objects and advantages of the invention will be made apparent from the following detailed description taken together with the drawings.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
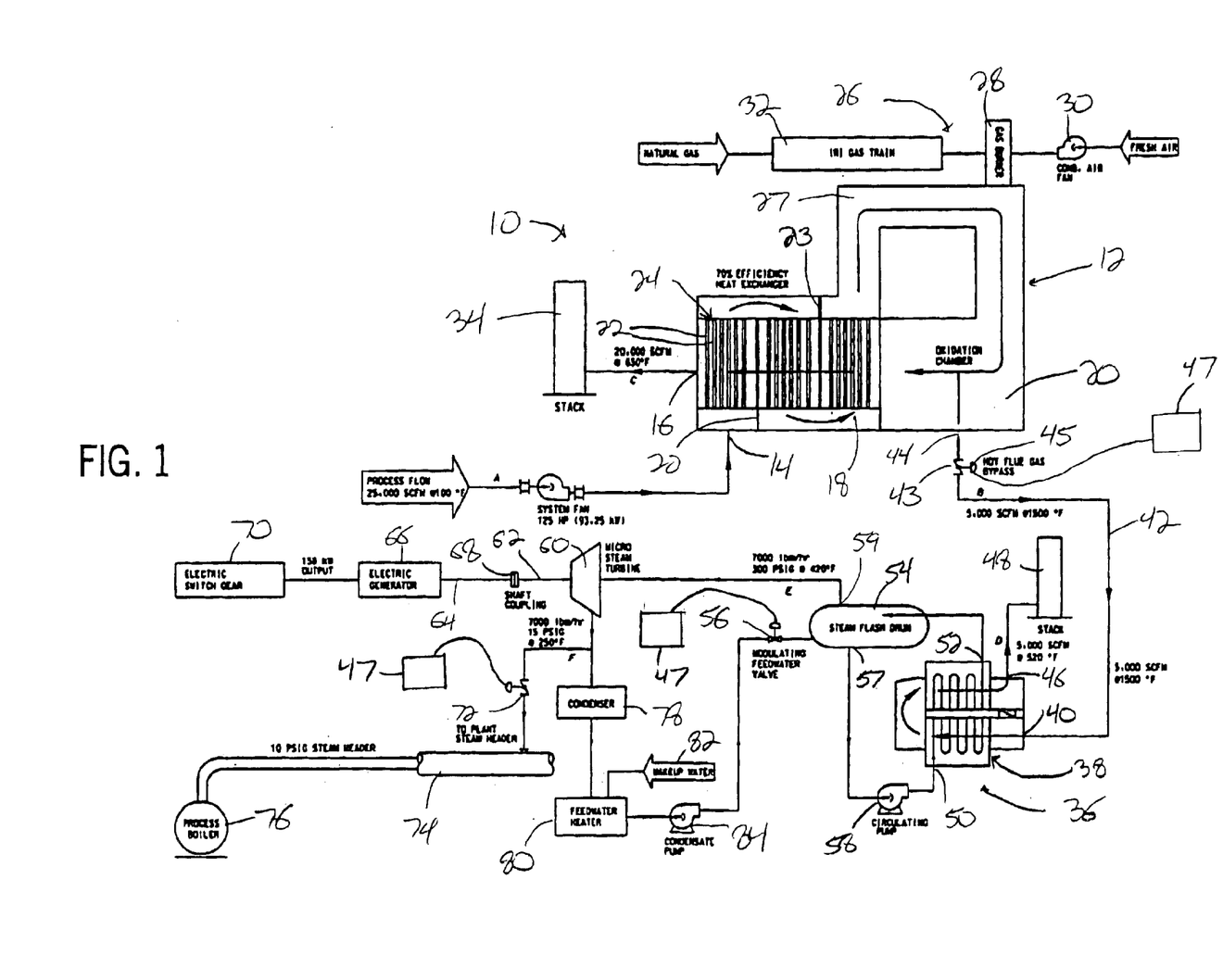
FIG. 1 is a process diagram of a first embodiment of the power generation system of the present invention.

With reference now to the drawing figures in which like reference numerals designate like parts throughout the disclosure, a system for oxidizing pollutants within a process gas stream is indicated generally at 10 in FIG. 1. The system 10 includes a conventional recuperative oxidizer 12 having an inlet 14, and outlet 16, a heat exchange chamber 18 and an oxidation chamber 20. The inlet 14 and outlet 16 are formed on separate portions of the heat exchange chamber 18, such that an incoming process gas stream from the inlet 14 can thermally contact the oxidized or treated process gas stream exiting the oxidation chamber 20 through the outlet 16. This is accomplished by directing the incoming process gas stream through separate sets of tubes 22 disposed in an inlet section of the heat exchange chamber 18 and separated by baffles 23 to increase the residence time of the incoming process gas stream in the heat exchange chamber 18. The outgoing treated process gas stream from the oxidation chamber 20 flows through a separate outlet section of the heat exchange chamber 18 in a generally straight path to the outlet 16. The outgoing process gas stream is maintained in thermal contact with the tubes 22 by passing through a shell 24 of the heat exchange chamber 18 that surrounds the tubes 22. Thus, the tubes 22, baffles 23 and shell 24 enable a significant portion of the heat from the treated process gas stream to be transferred to the incoming process gas stream in the tubes 22 prior to the treated gas stream reaching the outlet 16 or the incoming gas stream reaching the oxidation chamber 20. This arrangement for the heat exchanger 18 achieves a thermal efficiency recovery of between 70% to 80%.

After being preheated by passing around and between the fins 24 in the heat exchange chamber 18, the incoming process gas stream is further heated as necessary within the recuperative oxidizer 12 by a heating element 26 disposed on a conduit 27 of the oxidizer 12 extending between the heat exchange chamber 18 and the oxidation chamber 20. The heating element 26 can be any conventional heating element used for this purpose but preferably includes a gas burner 28 attached directly to the conduit 27 leading to the oxidizing chamber 20 of the oxidizer 12, an air fan 30 connected to the gas burner and used to draw air, i.e., oxygen, into the burner 28, and a gas train 32 also connected to the burner 28 and used to supply a combustible gas, such as natural gas, to the gas burner 28 in combination with the air from the fan 30.

The burner 28 operates to further increase the temperature of the preheated gas entering the combustion chamber 20 from the heat exchange chamber 18 to an appropriate oxidation temperature of between 1400 to 1800 degrees F. At this temperature, the hazardous air pollutants (HAPs) and volatile organic compounds (VOCs) in the process gas stream are oxidized and break down into carbon dioxide ($CO_2$) and water vapor ($H_2O$) plus heat. These components are harmless and can pass with the remainder of the treated process gas stream through the oxidation chamber 20 and outlet section of the heat exchange chamber 18 to the outlet 16 for venting to the atmosphere through a stack 34. The heat generated by the oxidation reaction is used to maintain the temperature of the oxidation chamber 20 above the lower limit of about 1400 degrees F. in order to limit the amount of additional heating needed from the burner 28.

The power generation from the system 10 is performed by a power generation system 36 disposed separately from but connected to the oxidation system 10. The power generation of the present invention is intended to generate combined heat and power (CHP) from the existing hot gases within the RTO. This generation of (CHP) in this manner will result in the elimination of $CO_2$ from a boiler generating the equivalent amount of steam and the elimination of $CO_2$ from a utility generating electric power.

The power generation system 36 includes a heat exchanger 38 including a gas inlet 40 that is connected to a high temperature duct 42 that includes a bypass valve 43 spaced from the heat exchanger 38. The duct 42 is connected opposite the inlet 40 on the exchanger 38 to a bypass opening 44 disposed on the oxidation chamber 20 of the oxidizer 12 to enable treated process gas to flow from the chamber 20 through the duct 42 to the exchanger 38. The valve 43 is used to control the flow of the treated process gas stream into the duct 42 so that only a portion of the oxidized process gas stream is diverted from the oxidation chamber. More specifically, when the valve 43 is opened, a portion of the oxidized process gas stream flowing through the oxidation chamber 20 passes through the bypass opening 44 and is directed through the duct 42 into the hot gas inlet 40 of the heat exchanger 38. The diverted process gas stream flows through the exchanger 38 to a hot gas outlet 46 that is connected opposite the exchanger 38 to a stack 48 used to vent the now-cooled diverted process gas stream to the atmosphere.

In a particularly preferred embodiment, the valve 43 includes an actuator 45 that is connected to a controller 47 that remotely operates the actuator 45 and valve 43 to divert treated process gas into the duct 42 as necessary based on other information supplied to the controller 47 regarding the operation of the system 36.

In order to handle the highly elevated temperatures of the diverted process gas system (>1400° F.), the heat exchanger 38, the duct 42 and the valve 43 are all designed to handle the flow of the diverted hot process gas. With this in mind, the heat exchanger 38 can be a fin and tube, cross-flow or any other suitable type of heat exchanger capable of withstanding the high initial temperatures (>400° F.) of the treated process gas stream. Further, the duct 42 is preferably a conventional high temperature duct including suitable insulation and lined with 6" thermal ceramics fiber. Also, the valve 43 is preferably a refractory lined butterfly valve Model No. RC1450-SR sold by Mader Dampers.

The diverted process gas stream entering the heat exchanger 38 is preferably less than 40% of the volumetric flow rate of the total oxidized process gas stream, and most preferably is less than 30% of the volumetric flow rate of the total process gas stream. The diverted stream enters the exchanger 38 through the hot gas inlet 40 and thermally contacts a water stream entering the heat exchanger 38 through a water stream inlet 50. The water stream is thermally contacted by the diverted process gas stream within the heat exchanger 38 such that the water stream is converted to a flow of superheated water prior to reaching a water stream outlet 52. The flow of superheated water continues from the outlet 52 to a flash drum 54 where the superheated water flashes or separates into water vapor or steam, and water. To do so effectively, the flash drum 54 must be capable of withstanding the high temperatures of the superheated water supplied to the drum 54 and the high pressures of the superheated steam flowing out of the flash drum.

After the flash separation in the drum 54, the water formed collects at the bottom of the drum 54 and is combined with feed water coming from a feed water valve 56 connected to the drum 54. The combined flash water and feed water is directed from the drum 54 through a water outlet 57 to a circulating pump 58 which directs the combined water stream into the water stream inlet 50 of the heat exchanger 38 for reuse in the system 36.

The pressurized and superheated steam component of the flash separation has a pressure of between 150 and 350 psig and a temperature of between 350° F. and 450° F., and is directed out of the drum 54 through a steam outlet 59 and passed to a microsteam turbine 60. The turbine 60 can be any conventional turbine capable of using an incoming steam flow to operate the turbine, but is preferably a Frame 350 single stage turbine sold by Dresser-Rand. The turbine 60 allows the pressurized incoming steam to operate the turbine 60 and rotate an output shaft 62 operably connected to the turbine 60. More specifically, the turbine 60 allows the steam to expand within a housing for the turbine 60, causing a large pressure drop for the steam within the turbine 60, such that the steam contacts and rotates turbine blades (not shown) connected to the rotatable output shaft 62 in a known manner.

The output shaft 62 is operably connected opposite the turbine 60 to an input shaft 64 of an electric generator 66 by a shaft coupling 68. The coupling 68 enables the input shaft 64 to rotate in conjunction with the output shaft 62 to effect the generation of electric power by the generator 66 in a known manner. The power created by the generator 66 is then directed to an electric switch gear 70 which enables the electric power from the generator 66 to be supplied to the plant in which the oxidation system 10 and power generation system 36 are located, such as by diverting the power to the electric grid for the plant. Alternatively, if the electric power is not needed by the plant, the power can be directed from the switch gear 70 back to a utility for distribution to another customer.

After passing through the turbine 60, the flow of now low pressure steam (about 15 psig) can be diverted by a second valve 72 to a steam header 74 that directs the steam to a process boiler 76 located within the plant, such as an ESG Model 816H17CSS boiler sold by Cain Industries of Germantown, Wis. From the boiler 76, the low pressure steam can be utilized in any number of other operations of the plant, such as for the heating of the plant.

The remainder of the steam not diverted by the valve 72 to the boiler 76, if any, or, if the valve 72 is closed, all of the steam exiting the turbine 60 is then directed to a condenser 78 where the steam is condensed into feedwater which is supplied to a feedwater heater 80. The amount of feedwater from the condenser 78 is supplemented within the heater 80 by make-up water from a make-up water supply 82 also connected to the heater 80. The combined feedwater is then directed from the heater 80 by a condensate pump 84 to the feedwater valve 56 which, as described previously, controls the flow of the feedwater into the flash drum 54.

Figure 2:
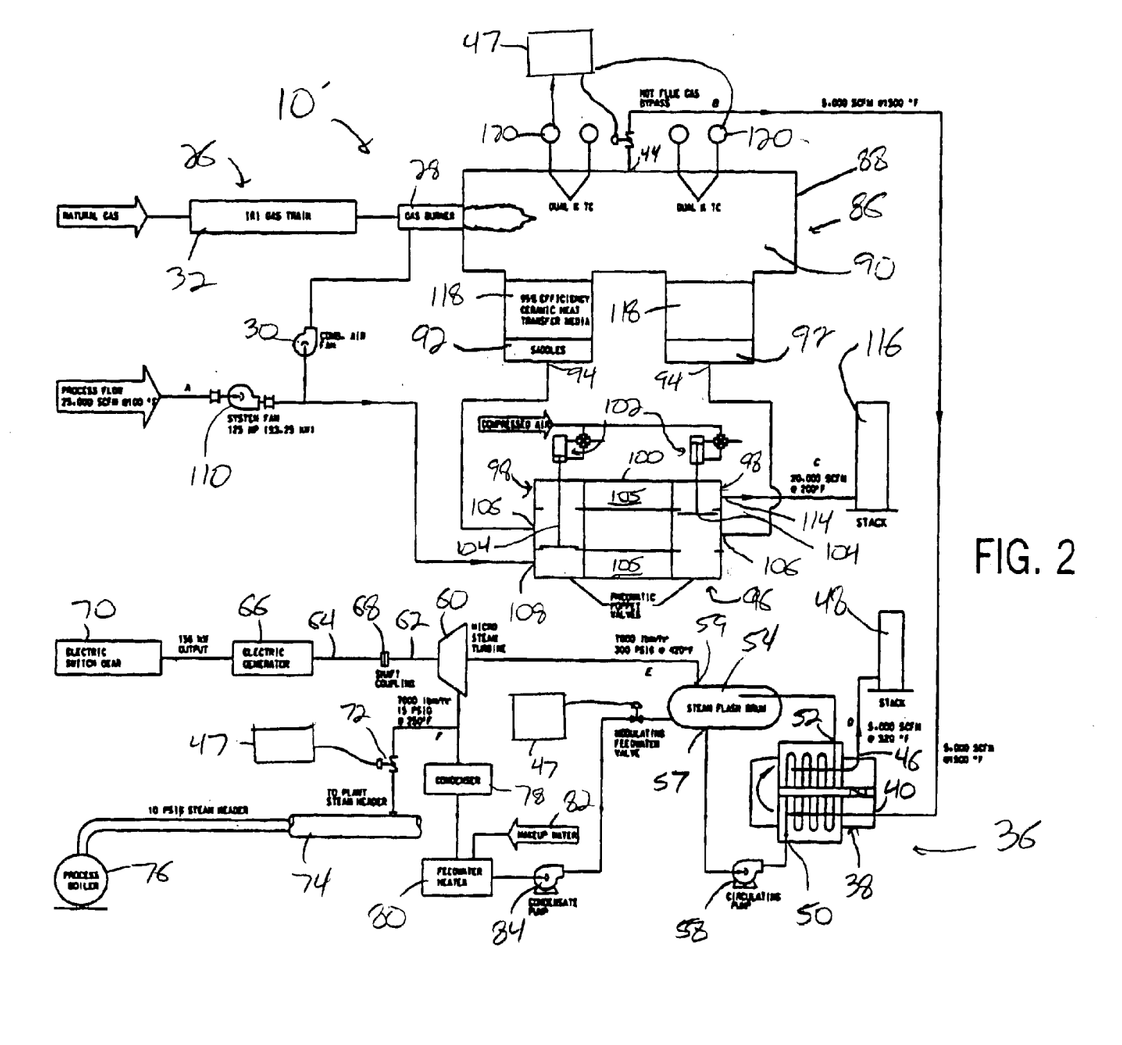
FIG. 2 is a process diagram of a second embodiment of the system of FIG. 1.

Referring now to FIG. 2, a second oxidation system 10' is illustrated in use with the power generation system 36. The system 10' includes a regenerative thermal oxidizer 86 that is positioned in place of the recuperative thermal oxidizer 12. The oxidizer 86 includes an oxidation chamber 88 including an oxidation area 90 and a pair of heat transfer areas 92, though the use of two heat transfer areas 92 is only a preferred embodiment of the system 10'. Each of the heat transfer areas 92 is connected to an inlet/outlet 94 opposite the oxidation area 90 through which a process gas stream can be directed into and out of the oxidation chamber 88.

Each inlet/outlet 94 is connected opposite the heat transfer area 92 to a valve assembly 96. The valve assembly 96 includes a pair of pneumatic or hydraulic poppet valves 98 disposed on opposite sides of an assembly housing 100. The number of valves 98 corresponds to the number of heat transfer areas 92 in the oxidizer 86 such that the flow of the process gas stream into and out of each heat transfer area 92 is separately controlled. The valves 98 are preferably pneumatic poppet valves, as stated previously, but the valves 98 can also be any type of valve capable of withstanding the elevated temperatures of the oxidized process gas stream other than the poppet valves 98.

The operation of each valve 98 is controlled by a separate compressed air actuator 102 that is connected to a piston 104 located within each valve 98. The actuator 102 serves to move the piston 104 within the valve 98 in order to vary the flow path of the process gas stream through a pair of flow channels 105 extending between the valves 98 in the housing 100, and through the oxidizer 86. Each valve 98 is further connected to a gas inlet/outlet 106 that is disposed on the housing 100 and which is connected with one of the inlet/outlets 94 on the heat transfer area 92 of the chamber 88 to direct the process gas stream to and from the oxidizer 86.

The assembly 96 also includes a gas stream inlet 108 connected to one of the valves 98 and through which the incoming process gas stream is supplied to the regenerative thermal oxidizer 86. The process gas stream is moved to the gas inlet 108 at a desired flow rate by a fan 110 disposed upstream of the inlet 108. Opposite the gas stream inlet 108, the assembly 96 also includes a gas stream outlet 114 connected to the other valve 98 that directs the oxidized process gas stream from the oxidation chamber 88 and the valve assembly 96 to a stack 116 for venting to the atmosphere.

When the system 10' is in operation, the incoming process gas stream is directed into the inlet 108 on the valve assembly 96 by the fan 110. The poppet valves 98 direct the gas stream along one of the channels 105 through one of the inlet/outlets 106 into the associated heat transfer area 92. Each heat transfer area 92 includes an amount of a solid heat transfer media, preferably a ceramic heat transfer media that forms a saddle or a structural media 118 with the area 92. The incoming process gas passes through the ceramic media 118 and is heated prior to reaching the oxidation chamber 88 by heat retained in the media 118 from previously oxidized process gas passing through the media 118 in the opposite direction. The preheated process gas stream then enters the oxidation area 90 of the oxidation chamber 88 for further heating and oxidation of the hydrocarbons in the process gas stream by the heating element 26. The heating element 26 is connected to the oxidation area 90 and is similar to the element 26 used with the recuperative thermal oxidizer 12, with the only optional addition being that the air fan 30 is also connected to the incoming waste gas stream when used with the regenerative thermal oxidizer 86. Because of the hydrocarbon components that are present in the process gas stream, a portion of the incoming process gas stream can also be diverted from the incoming process gas stream upstream of the inlet 108 by the air fan 30 and mixed with air so that the hydrocarbons can be used with the burner 28 in the heating element 26 as fuel for heating the remainder of the incoming process gas within the oxidation chamber 88.

In order to ensure that the temperature within the oxidation chamber 88 is maintained above the minimum temperature required to fully oxidize the hazardous components in the process gas stream, the temperature within the oxidation area 90 of the oxidation chamber 88 is monitored by a pair of thermocouples 120 positioned on the chamber 88. The number of thermocouples 120 can be varied to provide data on any number of areas in the chamber 88 in order to ensure that no "cold spots" exist within the chamber 88, but two thermocouples 120 are preferred. Each thermocouple 120 provides information on the temperature within the chamber 88 to the control system 47 that is capable of adjusting the operation of the heating element 26 to which the control system 47 is also connected in order to maintain the operating temperature of the regenerative thermal oxidizer 86 above the minimum operating temperature.

To maintain each of the ceramic media beds 118 at a temperature capable of sufficiently preheating the incoming process gas stream, i.e., achieve a thermal efficiency recovery of between 80% and 97%, the valves 98 can be operated to direct the incoming process gas stream flows through the opposite flow channel 105 and through the oxidizer 86 in the opposite direction. Thus, the ceramic media beds 118 that previously was absorbing heat from the oxidized process gas stream is now transferring that heat to the incoming process gas stream and the saddle 118 that was previously transferring heat to the incoming process gas stream now can absorb heat from the oxidized process gas that is exiting the oxidizer 86.

The system 10' also includes the power generation system 36 as discussed with regard to the oxidation system 10 illustrated in FIG. 1. The duct 42 and valve 43 are connected to the oxidation area 90 of the oxidation chamber 88 opposite the heat transfer areas 92 to withdraw an amount of the oxidized waste gas stream from within the chamber 88 for use in the system 36 in the same manner as described previously.

In an example of the use of the power generation system 36 with an oxidation system 10' employing a regenerative thermal oxidizer 86, the system 10' has an incoming process gas flow of 25,000 SCFM, although the oxidizer 86 can be sized to accommodate process gas flow volumes of 2,000 SCFM to 500,000 SCFM. Also, the oxidizer 86 selected has a Thermal Efficiency Recovery (TER) of 95%, although the oxidizer 86 can have a TER of from 80% to 97%, as stated previously. Further, the incoming process gas stream to the oxidizer 86 selected has a VOC concentration of 5% of the Lower Explosive Limit (LEL) of the mixture. At this VOC concentration, the oxidizer 86 requires no additional auxiliary natural gas to oxidize or convert the VOCs in the process gas stream to carbon dioxide and water vapor.

Figure 3:
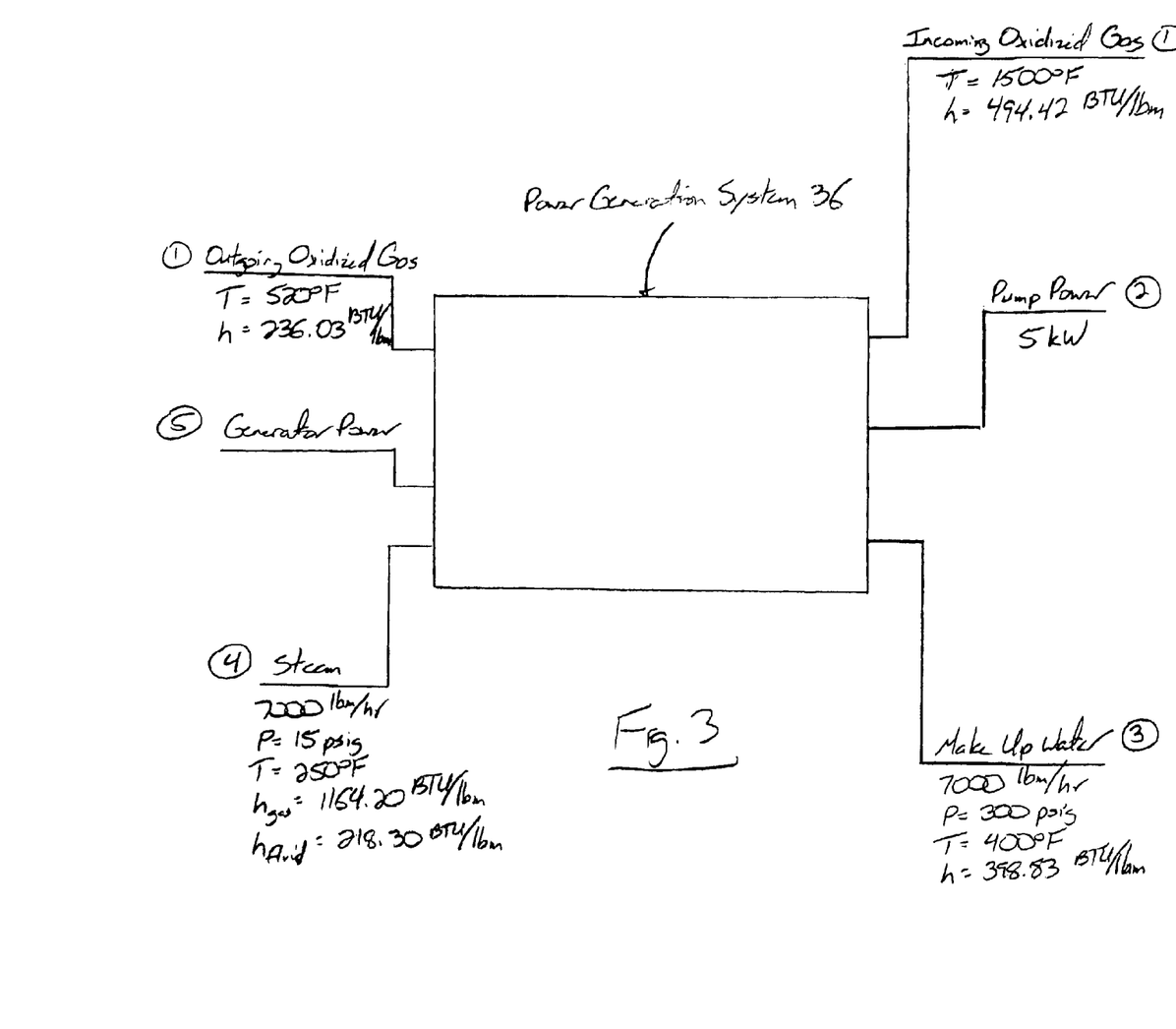
FIG. 3 is a total energy input/output diagram for the system of FIG. 1.

Referring now to FIG. 3, an overall energy diagram for the example system 36 described above is shown. The diagram represents the energy inputs and outputs for the power generation system 36 when an oxidized process gas flow of 5000 ft$^3$/min at 1500° F. is diverted from the oxidizer 86 and utilized within the system 36. This process gas flow is also assumed to exit the system 36 at a temperature of 520° F. and without any losses in the flow rate of the process gas stream. The specific energy values for the various gas and water streams are shown in the diagram and are used to determine the power generated by the system 36 as follows:

Energy Inputs:

---

Energy Inputs:

① Process Gas Stream Mass Flow Rate:
5000 ft$^3$/min × 0.075 lbm/ft$^3$ × 60 min/hr = 22500 lbm/hr
Power Absorbed by System From Process Gas Stream:
22500 lbm/hr × (494.42 btu/lbm (1500° F.) − 236.03 btu/lbm (520° F.)) = 5813775 btu/hr
② Condensate and Circulating Pump Power: 5kw ≈ 17604 btu/hr
③ Make-Up Water Flow Power:
E = 7000 lbm/hr × 398.83 btu/lbm = 2791810 btu/hr Energy Outputs:

④ Steam Flow (15 psig) Power:
7000 lbm/hr × (1164.20 × −218.80(1−x)) btu/lbm Steam Flow Energy (x = steam quality) where x = 1, Steam Flow Power = 8149400 btu/hr
⑤ Generator Power:
① + ② + ③ = ④ + ⑤
⑤ = ① + ② + ③ − ④
 = 5813775 btu/hr + 17604 btu/hr 2791810 btu/hr − 8149400 btu/hr
 = 473789 btu/hr
 = 138.8 kW

---

Furthermore, based on the amount of steam and electrical power supplied by the power generation system 36 as determined above, it is possible to determine the amount of $CO_2$ production that is eliminated by the generation of this amount of power using the system 36. In the example of FIG. 3, as stated above the diverted process gas stream is 5,000 SCFM @1500° F. and will generate 138.8 kw of electric power and 7,000 pounds/hour of 15 psig steam at 250° F. For a coal fired utility generating electric power, it is assumed that:

1) The thermal energy content of coal = 6,150 kWh/ton of coal.
2) 40% of thermal energy is converted to electricity.
3) Useable energy = 0.4 × 6,150 kWh/ton
   = 2,460 kWh/ton of coal If a typical large 500 megawatt facility generates 1.057× 10(−3) tons $CO_2$/kWh, the proposed invention would reduce $CO_2$ emissions by:

138.8 kW×8,760 hours/year×1.057×10(−3) $CO_2$/kWh=1, 285 tons $CO_2$.

In addition, as shown above, the steam generation from the system 36 of the present invention yields approximately 8 million BTU/hr or 70080 million BTU/year (8 million BTU/hr×8760 hps/yr). Since a boiler operating on natural gas generates 116.8 lbs $CO_2$/1 million BTU, the steam generated by the system 36 saves:

(116.8 lbs $CO_2$/1 million BTU) × 70,080 million BTU/year
= 8.2 million lbs. $CO_2$/year
= 4,092 tons $CO_2$/year While the above description illustrates the best modes of the invention, other embodiments are also considered to be within the scope of the present invention. For example, the system 36 could eliminate the flash drum 54 and supply a flow of pressurized steam directly to the heat exchanger 38 for heating by the diverted portion of the process gas stream. Further, the oxidizer can be other than a recuperative oxidizer 12 or a regenerative oxidizer 86.

Various alternatives of the system of the present invention are also contemplated as being within the scope of the following claims that particularly point out and distinctly claim the subject matter regarded as the present invention.

I claim:

1. A system for regenerating power, the system comprising:
   a) a means for oxidizing an incoming process gas stream to remove pollutants from the process gas stream prior to discharging the process gas stream to the atmosphere;
   b) a diverter for removing a portion of the process gas stream from the oxidizing means;
   c) a heat exchanger connected to the diverter opposite the oxidizing means and used to transfer heat from the diverted portion of the process gas stream to a steam flow within a conduit also connected to the heat exchanger;
   d) a steam turbine connected to the steam flow downstream from the heat exchanger; and
   e) a connection from the steam flow conduit to a steam header.

2. The system of claim 1 wherein the means for oxidizing is a regenerative thermal oxidizer.

3. The system of claim 1 wherein the oxidizing means is a recuperative thermal oxidizer.

4. The system of claim 1 wherein the connection is located on the steam flow conduit downstream of the steam turbine.

5. The system of claim 1 wherein the connection includes a first valve to divert a portion of the steam flow from the steam flow conduit to the steam header.

6. The system of claim 5 wherein the steam flow less the diverted portion is directed to the heat exchanger.

7. The system of claim 1 wherein the steam flow conduit includes a flash drum downstream from the heat exchanger.

8. The system of claim 7 wherein an amount of water in the flash drum is directed to the heat exchanger.

9. The system of claim 1 further comprising an electric generator connected to an output shaft of the steam turbine.

10. The system of claim 1 wherein the steam turbine is a micro steam turbine.

11. The system of claim 1 further comprising a stack connected to the heat exchanger and configured to vent the process gas stream to the atmosphere after the gas stream passes through the heat exchanger.

12. The system of claim 1 wherein the diverted portion is less than 40% of the volumetric flow rate of the process gas stream.

13. The system of claim 12 wherein the diverted portion is less than 30% of the volumetric flow rate of the process gas stream.

14. The system of claim 1 wherein the diverter comprises:
   a) a high temperature duct connected between the means for oxidizing and the heat exchanger; and
   b) a selectively operable second valve disposed on the duct.

15. A method for generating power from a process gas stream comprising the stems of:
   a) passing the process gas stream through a thermal oxidizer;
   b) diverting a portion of the oxidized process gas stream from the oxidizer;
   c) passing the portion of the oxidized process gas stream through a heat exchanger to form a pressurized steam flow;
   d) passing the pressurized steam flow through a steam turbine to generate electric power and form a depressurized steam flow; and
   e) passing a portion of the depressurized steam flow to a steam header.

16. The method of claim 15 wherein the step of passing the portion of the heated steam flow to the steam header comprises operating a first valve.

17. The method of claim 15 wherein the step of diverting the portion of the oxidized process gas stream comprises selectively operating a second valve.

18. The method of claim 15 wherein the step of diverting the portion of the oxidized process gas stream comprises diverting less than 40% of total volumetric flow rate of the oxidized process gas stream.

19. The method of claim 18 wherein the step of diverting the portion of the oxidized process gas stream comprises diverting less than 30% of the total volumetric flow rate of the oxidized process gas stream.

20. The method of claim 15 further comprising the step of venting the portion of the oxidized process gas stream to the atmosphere after passing the portion of the oxidized process gas stream through the heat exchanger.

21. A method for generating power from a process gas stream comprising the stems of:
   a) passing the process gas stream through a thermal oxidizer;
   b) diverting a portion of the oxidized process gas stream that is less than 100% of the volumetric flow rate for the gas stream from the oxidizer;
   c) passing the portion of the oxidized process gas stream through a heat exchanger;
   d) simultaneously passing a water flow through the heat exchanger to form a superheated water flow;

e) passing the superheated water flow through a flash drum to form a pressurized steam flow; and d) passing the pressurized steam flow through a steam turbine to generate electric power and form a depressurized steam flow.

22. The method of claim 15 further comprising the step of recirculating the depressurized steam flow to the heat exchanger after passing the pressurized steam flow through the steam turbine.

23. A system for using a part of an oxidized process gas stream from a thermal oxidizer to generate power, the system comprising:

a. a diverter assembly including a duct adapted to be connected to the thermal oxidizer, and a valve disposed on the duct;

b. a heat exchanger having a gas inlet connected to the duct, a water inlet, a gas outlet and a water outlet, c. a flash drum connected to the water outlet and to the water inlet;

d. a steam turbine having a steam inlet connected to the flash drum and a steam outlet connected to a steam header; and e. a feed water supply connected to the flash drum.

* * * * *